United States Patent
Zaddack et al.

(10) Patent No.: US 10,857,761 B2
(45) Date of Patent: Dec. 8, 2020

(54) COMPOSITE ADHESIVE LAYER FOR A LAMINATE STRUCTURE

(71) Applicant: IFS Industries Inc., Reading, PA (US)

(72) Inventors: Scott Zaddack, New London, WI (US); Joel Snyder, Wyomissing, PA (US); Andrew Michael Kawaja, San Francisco, CA (US); William L. Bunnelle, Ham Lake, MN (US)

(73) Assignee: IFS Industries Inc., Reading, PA (US)

( * ) Notice: Subject to any disclaimer, the term of this patent is extended or adjusted under 35 U.S.C. 154(b) by 0 days.

(21) Appl. No.: 16/267,036

(22) Filed: Feb. 4, 2019

(65) Prior Publication Data

US 2019/0366683 A1    Dec. 5, 2019

Related U.S. Application Data

(63) Continuation of application No. 15/354,652, filed on Nov. 17, 2016, now Pat. No. 10,195,820.
(Continued)

(51) Int. Cl.
*B32B 3/00* (2006.01)
*B32B 7/12* (2006.01)
(Continued)

(52) U.S. Cl.
CPC .................. *B32B 7/12* (2013.01); *B32B 5/02* (2013.01); *B32B 5/18* (2013.01); *B32B 5/245* (2013.01); *B32B 5/26* (2013.01); *B32B 5/32* (2013.01); *B32B 7/14* (2013.01); *B32B 9/002* (2013.01); *B32B 9/005* (2013.01); *B32B 9/041* (2013.01); *B32B 9/042* (2013.01); *B32B 9/045* (2013.01); *B32B 9/046* (2013.01); *B32B 9/047* (2013.01); *B32B 9/06* (2013.01); *B32B 15/043* (2013.01);
(Continued)

(58) Field of Classification Search
CPC .................................... B32B 7/12; B32B 5/18
See application file for complete search history.

(56) References Cited

U.S. PATENT DOCUMENTS

| 5,536,576 A | 7/1996 | Hishida |
| 5,686,169 A | 11/1997 | Hassall |

(Continued)

FOREIGN PATENT DOCUMENTS

| DE | 19961366 | 7/2001 |
| WO | WO 1996/07522 | 3/1996 |

(Continued)

OTHER PUBLICATIONS

International Search Report and Written Opinion in International Application No. PCT/US16/62579, dated Feb. 1, 2017, 18 pages.
(Continued)

*Primary Examiner* — Elizabeth E Mulvaney
(74) *Attorney, Agent, or Firm* — Fish & Richardson P.C.

(57) ABSTRACT

An article includes a substrate including a bonding surface area, a first adhesive disposed on the bonding surface area in a first discrete pattern, the first adhesive comprising a hot melt adhesive, and a second adhesive disposed on the bonding surface area in a second discrete pattern that is complementary to the first discrete pattern, wherein the first discrete pattern comprises about 1% to about 25% of the bonding surface area and the second discrete pattern comprises a balance of the bonding surface area.

19 Claims, 5 Drawing Sheets

Related U.S. Application Data (60) Provisional application No. 62/256,518, filed on Nov. 17, 2015.

(51) Int. Cl.

| | | |
|---|---|---|
| *B32B 37/12* | (2006.01) | |
| *B32B 5/02* | (2006.01) | |
| *B32B 5/18* | (2006.01) | |
| *B32B 5/24* | (2006.01) | |
| *B32B 5/26* | (2006.01) | |
| *B32B 5/32* | (2006.01) | |
| *B32B 7/14* | (2006.01) | |
| *B32B 9/00* | (2006.01) | |
| *B32B 9/04* | (2006.01) | |
| *B32B 9/06* | (2006.01) | |
| *B32B 15/04* | (2006.01) | |
| *B32B 15/10* | (2006.01) | |
| *B32B 15/12* | (2006.01) | |
| *B32B 15/14* | (2006.01) | |
| *B32B 15/18* | (2006.01) | |
| *B32B 17/00* | (2006.01) | |
| *B32B 21/02* | (2006.01) | |
| *B32B 21/04* | (2006.01) | |
| *B32B 21/06* | (2006.01) | |
| *B32B 21/08* | (2006.01) | |
| *B32B 21/10* | (2006.01) | |
| *B32B 27/06* | (2006.01) | |
| *B32B 27/08* | (2006.01) | |
| *B32B 27/10* | (2006.01) | |
| *B32B 27/12* | (2006.01) | |
| *B32B 27/30* | (2006.01) | |
| *B32B 27/32* | (2006.01) | |
| *B32B 27/36* | (2006.01) | |
| *B32B 29/00* | (2006.01) | |
| *B32B 29/02* | (2006.01) | |
| *B32B 27/40* | (2006.01) | |
| *B32B 37/10* | (2006.01) | |
| *C09J 5/00* | (2006.01) | |
| *C09J 123/00* | (2006.01) | |
| *C09J 123/14* | (2006.01) | |
| *C09J 123/20* | (2006.01) | |
| *C09J 131/04* | (2006.01) | |
| *C09J 153/00* | (2006.01) | |
| *C09J 175/04* | (2006.01) | |

(52) U.S. Cl.
CPC ......... *B32B 15/046* (2013.01); *B32B 15/10* (2013.01); *B32B 15/12* (2013.01); *B32B 15/14* (2013.01); *B32B 15/18* (2013.01); *B32B 17/00* (2013.01); *B32B 21/02* (2013.01); *B32B 21/04* (2013.01); *B32B 21/042* (2013.01); *B32B 21/047* (2013.01); *B32B 21/06* (2013.01); *B32B 21/08* (2013.01); *B32B 21/10* (2013.01); *B32B 27/065* (2013.01); *B32B 27/08* (2013.01); *B32B 27/10* (2013.01); *B32B 27/12* (2013.01); *B32B 27/30* (2013.01); *B32B 27/302* (2013.01); *B32B 27/308* (2013.01); *B32B 27/32* (2013.01); *B32B 27/327* (2013.01); *B32B 27/36* (2013.01); *B32B 27/40* (2013.01); *B32B 29/005* (2013.01); *B32B 29/007* (2013.01); *B32B 29/02* (2013.01); *B32B 37/10* (2013.01); *B32B 37/12* (2013.01); *B32B 37/1292* (2013.01); *C09J 5/00* (2013.01); *C09J 123/00* (2013.01); *C09J 123/14* (2013.01); *C09J 123/20* (2013.01); *C09J 131/04* (2013.01); *C09J 153/00* (2013.01); *C09J 175/04* (2013.01); *B32B 2037/1215* (2013.01); *B32B 2037/1223* (2013.01); *B32B 2250/02* (2013.01); *B32B 2262/067* (2013.01); *B32B 2262/101* (2013.01); *B32B 2270/00* (2013.01); *B32B 2307/50* (2013.01); *B32B 2307/702* (2013.01); *B32B 2307/704* (2013.01); *B32B 2307/72* (2013.01); *B32B 2307/732* (2013.01); *B32B 2419/04* (2013.01); *B32B 2437/02* (2013.01); *B32B 2457/00* (2013.01); *B32B 2479/00* (2013.01); *B32B 2509/00* (2013.01); *B32B 2535/00* (2013.01); *B32B 2553/00* (2013.01); *B32B 2555/00* (2013.01); *B32B 2605/00* (2013.01); *B32B 2607/00* (2013.01); *C08G 2170/20* (2013.01); *C08L 2205/03* (2013.01); *C09J 2423/00* (2013.01); *C09J 2423/10* (2013.01); *C09J 2431/00* (2013.01); *C09J 2453/00* (2013.01); *C09J 2475/00* (2013.01)

(56) References Cited

U.S. PATENT DOCUMENTS

| | | | |
|---|---|---|---|
| 5,876,852 A | 3/1999 | Hargarter et al. | |
| 5,987,852 A | 11/1999 | Bozich | |
| 6,430,898 B1 | 8/2002 | Remmers et al. | |
| 8,865,824 B2 | 10/2014 | Bunnelle | |
| 2006/0159900 A1* | 7/2006 | Miller | B32B 3/06 428/212 |
| 2006/0234014 A1 | 10/2006 | Liu | |
| 2008/0196831 A1* | 8/2008 | Friese | B60J 1/006 156/295 |
| 2014/0097037 A1* | 4/2014 | Wingfield | E04B 1/84 181/290 |
| 2014/0260080 A1 | 9/2014 | Swartzmiller et al. | |
| 2015/0017868 A1 | 1/2015 | Stafeil et al. | |
| 2015/0174286 A1 | 6/2015 | Bunnelle | |
| 2015/0299525 A1 | 10/2015 | Bunnelle | |
| 2015/0309353 A1 | 10/2015 | Stensvad | |
| 2016/0280977 A1 | 9/2016 | Chen | |

FOREIGN PATENT DOCUMENTS

| | | |
|---|---|---|
| WO | WO 1999/06210 | 2/1999 |
| WO | WO 2006/078243 | 7/2006 |
| WO | WO 2015/042501 | 3/2015 |

OTHER PUBLICATIONS

International Preliminary Report on Patentability in International Application No. PCT/US16/62579, dated May 31, 2018, 11 pages.

* cited by examiner

COMPOSITE ADHESIVE LAYER FOR A LAMINATE STRUCTURE

CLAIM OF PRIORITY

This application is a continuation of U.S. application Ser. No. 15/354,652, filed Nov. 17, 2016, which claims priority to U.S. Provisional Application Ser. No. 62/256,518, filed on Nov. 17, 2015, the entire contents of which are hereby incorporated by reference.

TECHNICAL FIELD

This invention relates to a composite adhesive layer for a laminate structure.

BACKGROUND

Many laminates structures can be formed by providing an adhesive layer between two or more substrates. Current adhesives, for example, a water-based adhesive, can lack an adequate initial green bond strength, a final bond strength, or require a longer than desired bonding time. A substantial need therefore exists for an improved adhesive bond structure that can be formed between two or more substrates to provide a sufficient green bond strength and a quick setting final bond strength.

SUMMARY

Disclosed herein are composite adhesive layers for bonding together a laminate structure containing two or more substrates. The laminate structure can be used to form an article suitable for various applications. In some embodiments, the laminate structure provided herein can be a component (e.g., a panel) for a door.

Composite adhesive layers provided herein can be applied to a surface of a substrate by application of first and second adhesives that together form a composite adhesive layer. In various embodiments, the first adhesive can include a hot melt adhesive. The composite adhesive layers provided herein are particularly useful for applications for making a laminate structure because the composite adhesive layers can provide a suitable green (immediate) bond strength as well as a suitable final bond strength. Green bond strength is defined in the present application as the ability of an adhesive to hold two surfaces together when first contacted and before the adhesive develops its ultimate bonding properties when fully cured or set. In certain embodiments, the composite adhesive includes a first adhesive that can provide a suitable initial green bond strength and a second adhesive that can provide a suitable final (fully set or cured) bond strength. Components (e.g., substrates) of the laminate structure can, in some embodiments, be initially adhered together by the first adhesive such that the laminate structure does not require a sustained compressional load while the second adhesive is setting, or curing. This can allow the laminate structure to continue on to subsequent processing steps during manufacturing such that the laminate structure can be made into a final article. The composite adhesive layer can therefore allow for faster manufacturing of the final article by adhering the substrates of the laminate structure together with a suitable bonding strength during and after manufacturing.

Certain embodiments provided herein of the composite adhesive layers have desirable bonding characteristics of at least two different adhesives that allow for more efficient and faster manufacturing of an article, and/or more reliably bonded final articles. In some embodiments, the composite adhesive layers provided herein have desirable bonding characteristics of at least two different adhesives that produce a final product having similar or superior bond characteristics, of either an initial bond or a final bond, or both, as compared to a final product comprising the first adhesive, or the second adhesive, but not both the first and the second adhesives.

In one aspect, an article is described that includes a substrate that has a bonding surface area, a first adhesive disposed on the bonding surface area in a first discrete pattern, and a second adhesive disposed on the bonding surface area in a second discrete pattern that is complementary to the first discrete pattern. The first adhesive includes a hot melt adhesive. The first discrete pattern is disposed on about 1% to about 25% of the bonding surface area and the second discrete pattern is disposed on a balance of the bonding surface area.

In another aspect, a method is described that includes applying a first adhesive to a bonding surface area of a substrate in a first discrete pattern and applying a second adhesive to the bonding surface area in a second discrete pattern that is complementary to the first discrete pattern. The first adhesive includes a hot melt adhesive.

In yet another aspect, a method is described that includes disposing a first adhesive on a bonding surface area of a first substrate in a first discrete pattern, where the first adhesive contains a urethane hot melt adhesive. The method also includes disposing a second adhesive on the bonding surface area in a second discrete pattern that is complementary to the first discrete pattern, placing a second substrate over the bonding surface area of the first substrate to form a laminate, and applying pressure for a predetermined time to the laminate to bond the first substrate to the second substrate.

In another aspect, a laminate is described that includes a first substrate, a second substrate, and an adhesive layer disposed between overlapping portions of the first and second substrates. The adhesive layer includes a hot melt adhesive and a second adhesive. In some embodiments, the hot melt adhesive can include a blend of a polyurethane and a thermoplastic polymer, in which the thermoplastic polymer comprises a polyesters, a vinyl polymer, an acrylic block copolymer, or combinations thereof. In some embodiments, the hot melt adhesive includes a blend of a polyurethane and a thermoplastic polymer, in which the thermoplastic polymer is selected from the group consisting of polyesters, vinyl polymers, acrylic block copolymers, and combinations thereof. In some embodiments, the second adhesive includes an acrylic polymer. In some embodiments, the second adhesive can be a thermoplastic comprises a vinyl acetate polymer and copolymer with ethylene, a polyacrylate, a polyamide, or combinations thereof. In some embodiments, the second adhesive is a thermoplastic polymer selected from a group consisting of vinyl acetate polymers and copolymers with ethylene, polyacrylates, polyamides, and combinations thereof. In some embodiments, the substrate includes medium density fiberboard or a hard wood. In some embodiments, the laminate includes a door panel. In some embodiments, the laminate includes a panel for flooring, furniture, or a vehicle. In some embodiments, the laminate includes a component for footwear, apparel, an appliance, a hygiene product, packaging, an electronic assembly, or a medical device.

In another aspect, a door laminate component is described that includes a substrate including a bonding surface area, a first adhesive, and a second adhesive. The substrate includes a medium density fiberboard (MDF) or a hard wood. The first adhesive is disposed on the bonding surface area in a first discrete pattern. The first adhesive can include a blend of a polyurethane and a thermoplastic polymer, in which the thermoplastic polymer comprises a polyester, a vinyl polymer, an acrylic block copolymer, and combinations thereof. The first adhesive includes a blend of a polyurethane and a thermoplastic polymer, in which the thermoplastic polymer is selected from the group consisting of polyesters, vinyl polymers, acrylic block copolymers, and combinations thereof. The first discrete pattern is located along a path that is adjacent to an outer perimeter of the bonding surface area, the path defined by a pre-determined width. The second adhesive is disposed on the bonding surface area in a second discrete pattern that is complementary to the first discrete pattern. The second adhesive includes a polyvinyl acetate. The first discrete pattern is disposed on about 10% to about 25% of the bonding surface area and the second discrete pattern is disposed on a remaining balance of the bonding surface area. In some embodiments, the pre-determined width of the path is about 0.5 inches or less.

In another aspect, a door laminate is described that includes a first substrate comprising medium density fiberboard (MDF) or a hard wood, a second substrate comprising a wooden door skin that comprises oak, cherry, maple, gum, cedar, birch, or combinations thereof, and an adhesive layer disposed between overlapping portions of the first substrate and the second substrate. The adhesive layer includes a first adhesive and a second adhesive. The first adhesive can include a blend of a polyurethane and a thermoplastic polymer, where the thermoplastic polymer is selected from the group consisting of polyesters, vinyl polymers, acrylic block copolymers, and combinations thereof, and the second adhesive includes a polyvinyl acetate.

The details of one or more embodiments of the invention are set forth in the description below. Other features, objects, and advantages of the invention will be apparent from the description and from the claims.

While the articles disclosed herein are amenable to various modifications and alternative forms, specific embodiments have been shown by way of example in the drawings and are described in detail below. The intention, however, is not to limit the articles provided herein to the particular embodiments described. On the contrary, the articles provided herein are intended to cover all modifications, equivalents, and alternatives falling within the scope of the embodiments as defined by the appended claims.

DETAILED DESCRIPTION

Figure 1:
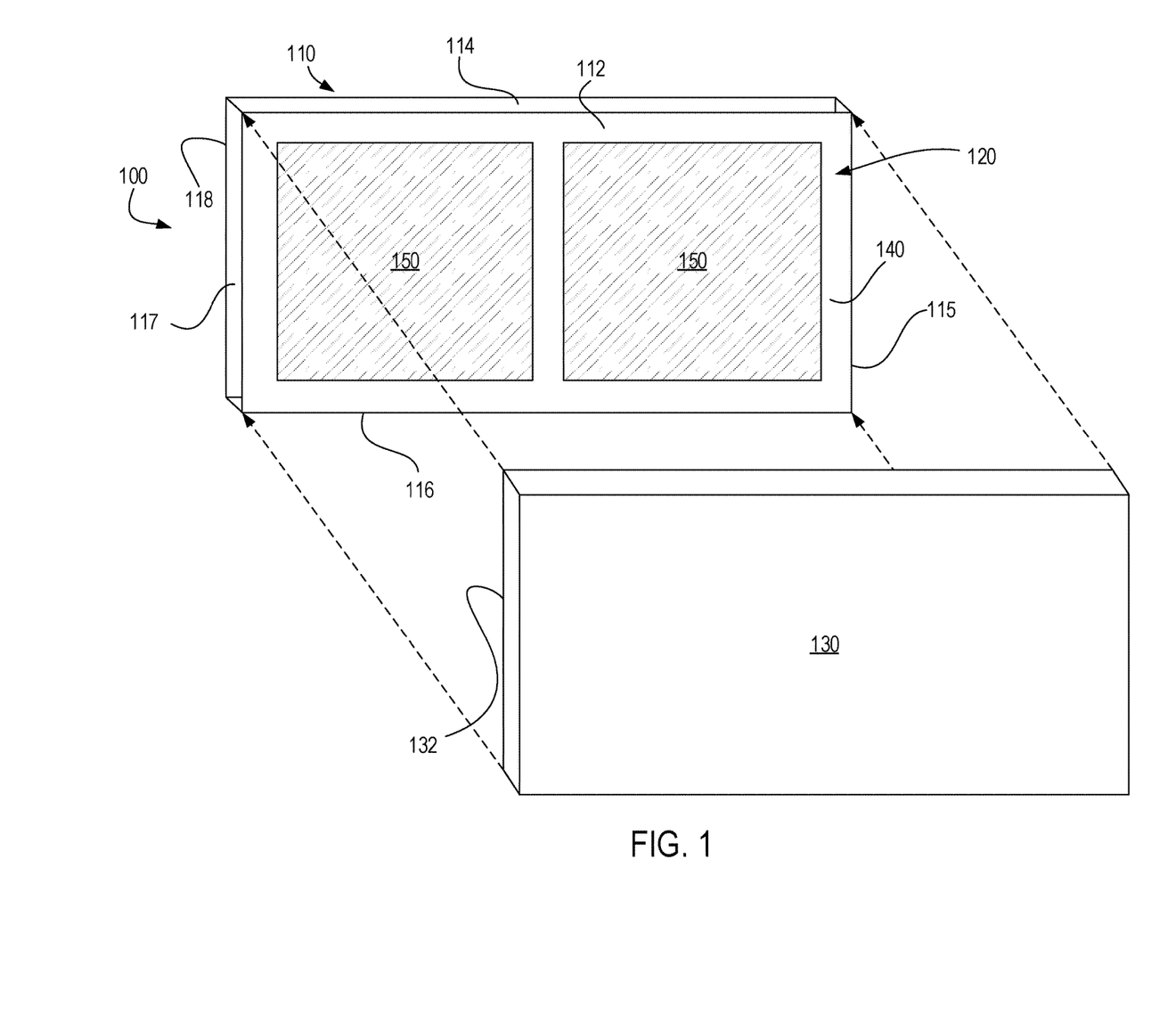
FIG. 1 is a partially exploded perspective view of an exemplary article provided herein, the article includes a first substrate, a composite adhesive layer, and a second substrate.

Referring to FIG. 1, an exemplary laminate structure 100 includes a bondable substrate, such as a first substrate 110, and a composite adhesive layer 120 disposed on at least one face, such as a first face 112, of the first substrate 110. The first substrate 110 can be bonded to a second substrate 130, or article, by the adhering the composite adhesive layer 120 to a surface 132 of the second substrate 130, thus forming the laminate structure 100. The laminate structure 100 provided herein can be used in various applications. For example, in some embodiments, the laminate structure 100 can form structural components, such as components (e.g., panels, side walls) for doors, flooring, motor vehicle (e.g., recreational vehicle), furniture, or the like. In some embodiments, the laminate structure 100 can form a component for footwear (e.g., shoes or boots), apparel, appliances, hygiene products (e.g., products including non-woven fabrics), packaging materials, an electronic assembly, and medical devices.

A bondable substrate, e.g., the first substrate 110, can include various suitable materials. Suitable materials of the first substrate 110 can include cellulose materials such as paper, wood, ceramics such as glass, minerals and stones, a metal such as a stainless steel, a polymer (e.g., a thermoplastic, a thermoset, or an elastomer), and combinations thereof. In some embodiments, the first substrate 110 can contain a medium density fiberboard, or a hard wood. In some embodiments, the first substrate 110 can include expanded polystyrene (EPS), fiberglass, and biologics (e.g., tissue, bone). The first substrate 110 can include various forms, such as foams, fibers, films, sheets, slats, panels, textiles (e.g., synthetic, natural, or both), and the like.

In the depicted embodiment of FIG. 1, the first substrate 110 includes a rectangular body that includes a first face 112 defined by a first side 114, a second side 115, a third side 116, and a fourth side 117. The depicted first substrate 110 also includes a second face 118. The sides 114, 115, 116, 117 can laterally extend from the first face 112 to the second face 118. A bondable substrate (e.g., the first substrate 110) can have one or more bonding surface areas on a face (e.g., the first face 112) or a side (e.g., the first side 114). In some embodiments, the bonding surface area can include a portion of or an entire face (e.g., the entire first face 112 of FIG. 1) of the first substrate 110.

Still referring to FIG. 1, the composite adhesive layer 120 is disposed on the first face 112 (e.g., the bonding surface) of the first substrate 110 such that the first face 112 of the substrate 110 can be bonded to another surface, such as the surface 132 of the second substrate 130. The depicted embodiment of the composite adhesive layer 120 includes two adhesives, a first adhesive 140 and a second adhesive 150, where the first adhesive 140 is disposed on the bonding surface area in a first discrete pattern and the second adhesive 150 disposed on the bonding surface area in a second discrete pattern that is complementary to the first discrete pattern. In some embodiments, the first and second adhesives 140, 150 can be disposed in two or more discrete patterns. The first adhesive can be any suitable adhesive that can provide a suitable initial green bond strength and the second adhesive can be any suitable adhesive that provides a suitable final (fully set or cured) bond strength. In some embodiments, the first adhesive includes an adhesive that sets or cures faster than the second adhesive such that at least two portions of an article can be held together during a manufacturing process before the second adhesive is in a fully cured or bonded state. The second adhesive can include an adhesive that sets or cures slower than the first adhesive, but can provide a final bond strength (i.e., bond strength after the adhesive has fully set or cured) that is equal to or higher than the final bond strength of the first adhesive. As such, one advantage of the composite adhesive layer is to provide an adhesive that has at least two different bonding characteristics.

In some embodiments, the first discrete pattern, or a combination of discrete patterns, of the first adhesive can cover from about 1% to about 25% (e.g., from about 1% to about 5%, from about 5% to about 10%, from about 10% to about 15%, from about 15% to about 20%, about 20% to about 25%) of the bonding surface area. Advantages of using a smaller amount of the first adhesive (e.g., about 1% to about 25%) can include, but are not limited to, minimizing chemical flumes, unpleasant smells, and/or high costs that can be associated with the first adhesive. Alternatively, some embodiments of the first discrete pattern can cover more than 25% (e.g., from about 25% to about 30%, from about 30% to about 50%, from about 50% to about 75%, from about 75% to about 100%).

In some embodiments, the second discrete pattern covers a balance of the remaining surface area of first face 112 of the substrate 110. For example, in some embodiments, the second discrete pattern, or a combination of discrete patterns, of the second adhesive 150 can cover from about 75% to about 99% (e.g., from about 75% to about 80%, from about 80% to about 85%, from about 85% to about 90%, from about 90% to about 95%, from about 95% to about 99%) of the bonding surface area (e.g., the first face 112 of the first substrate 110). The second discrete pattern can cover less than 75% of the surface area of a substrate surface (e.g., from about 10% to about 30%, from about 30% to about 50%, from about 50% to about 75% of the bonding surface area), in some embodiments.

In some embodiments, the first and second adhesives 140, 150 together form a continuous adhesive layer that substantially covers an entire bonding surface area of the first substrate 110. The first and second adhesives 140, 150 can optionally contact one another when applied on the bonding surface area.

In some embodiments, the first adhesive 140 can be applied to a surface (e.g., face 112) of the first substrate 110 and the second adhesive 150 can be applied to the surface 132 of the second substrate 130 in the one or more discrete patterns provided herein. In such embodiments, the composite adhesive layer 120 described herein can be formed when the adhesive-applied surfaces of the first and second substrates 110, 130 are brought together into contact for bonding.

The first adhesive 140 can be disposed on the bonding surface area in various different patterns. In some embodiments, the first adhesive 140 can be disposed along an outer perimeter of the first substrate 110. In some embodiments, the first adhesive 140 can form a grid pattern on the first substrate 110.

In various embodiments, the first adhesive 140 can be an adhesive having different physical, chemical, and/or mechanical properties than the second adhesive 150. In some embodiments, the first adhesive 140 includes a hot melt adhesive having a suitable green strength when the substrate is initially bonded to a second surface (e.g., the surface 132 of the second substrate 130).

The first adhesive 140 can include a variety of suitable hot melt adhesives. The first adhesive 140 can include a hot melt adhesive containing a thermoplastic polymer, a thermoset polymer, or a combination thereof. In some embodiments, a suitable hot melt adhesive can contains a urethane. In some embodiments, a suitable hot melt adhesive can include a blend of a polyurethane and a thermoplastic polymer. The thermoplastic polymer can include polyesters, vinyl polymers, acrylic block copolymers, and combinations thereof. In some cases, the first adhesive 140 can include an olfenic-based adhesive.

A "hot melt adhesive" defined within this application can include a formulation that generally includes several components, such as include one or more polymers to provide cohesive strength (e.g., aliphatic polyolefins including poly (ethylene-co-propylene) copolymer; ethylene vinyl acetate copolymers; styrene-butadiene or styrene-isoprene block copolymers; etc.); a resin or tackifier to provide adhesive strength (e.g., hydrocarbons distilled from petroleum distillates; rosins and/or rosin esters; terpenes derived, for example, from wood or citrus, etc.); optionally waxes, plasticizers or other materials to modify viscosity (e.g., materials that include, but are not limited to, mineral oil, polybutylene, paraffin oils, ester oils, and the like); and/or other additives including, but not limited to, antioxidants or other stabilizers.

A "polymer" defined within this application can include polymers derived from one species of monomers, copolymers, or terpolymers. In some cases, a polymer can include multiple species of a monomer, a copolymer, a terpolymer, or combinations thereof.

In some cases, a first exemplary composition of the first adhesive 140 can contain a blend of a polyurethane and a thermoplastic polymer can include an adhesive composition comprising: (a) at least one compound having two or more isocyanate groups; (b) at least one polyether polyol having a Mn≥4000; (c) an aromatic tackifying composition; (d) a thermoplastic polymer; and (e) an A-B or A-B-A acrylic block polymer wherein block A comprises an acrylic A block with a Tg of greater than 0° C. and an acrylic B block with a Tg of less than 0° C. For example, specific details of the first exemplary composition of the first adhesive can be found in U.S. Pat. Pub. No. 2015/0051358, the entire contents of which are incorporated herein by reference.

In some cases, a second exemplary composition of the first adhesive 140 can include an isocyanate prepolymer part useful in a two part urethane adhesive composition, in which a reactive polyol part is reacted with the isocyanate prepolymer part to form the adhesive bond. The isocyanate prepolymer can include (i) a polyether polyol; (ii) a polyester polyol; and (iii) an isocyanate compound wherein there is about 5 to 40 weight percent of the polyether polyol, about 0 to 80 weight percent of a polyester polyol, and about 20 to 50 weight percent of the isocyanate compound.

In some cases, a third exemplary composition of the first adhesive 140 can include a two-part urethane adhesive comprising: (i) a polyethylene oxide polymer selected from the polymers comprising polyethylene glycol, polypropylene glycol and mixtures thereof; (ii) an aliphatic polyester resin; (iii) a tackifing resin; and (iv) an isocyanate prepolymer composition. The prepolymer can include (a) a polyalkylene oxide compound comprising a polyethylene glycol, polypropylene glycol or mixtures thereof; (b) an aliphatic polyester resin, and (c) an isocyanate compound.

In some cases, an fourth exemplary composition of the first adhesive 140 can include a two part urethane adhesive that includes a polyalkylene oxide poly ether triol. The urethane adhesive can include: (i) a vinyl polymer; (ii) a tackifing resin; (iii) an accelerator; and (iv) an isocyanate prepolymer. The prepolymer can include (a) a polyalkylene oxide polymer; (b) a polyester comprising an aliphatic dicarboxylic acid and an aromatic dicarboxylic acid; and (c) an isocyanate compound.

In some cases, a fifth exemplary composition of the first adhesive 140 can include a two part urethane adhesive comprising: (i) a polyester comprising a mixed aliphatic dicarboxylic acid having 4 to 20 carbon atoms; (ii) a polyester comprising a mixed aliphatic and aromatic polyester comprising a C4-20 aliphatic dicarboxylic acid and an aromatic dicarboxylic acid comprising terephthallic acid, isophthalic acid or mixtures thereof; (iii) a particulate solid filler; (iv) an isocyanate activator compound; and (v) an isocyanate prepolymer. The prepolymer can include (a) a polyalkylene oxide polymer comprising polyethylene glycol, polypropylene glycol or a mixtures thereof; (b) a polyester comprising a mixed aliphatic and aromatic polyester comprising a C4-20 aliphatic dicarboxylic acid and an aromatic dicarboxylic acid comprising terephthallic acid, isophthalic acid or mixtures thereof; and (c) an isocyanate compound.

For example, specific details of the second, third, fourth, and fifth exemplary compositions of the first adhesive containing the two-part urethane adhesive described herein can be found in U.S. Pat. Pub. No. 2016/0280977, the entire contents of which are incorporated herein by reference.

Certain embodiments of the composite adhesive layer 120 provided herein contain a first adhesive that includes an olefinic-based adhesive. In some cases, the first adhesive can include a polymer that includes an amorphous polyolefin (APO), or an amorphous polyalphaolefins (APAO). In some cases, the APAO polymer can include random copolymers or terpolymers of ethylene, propylene, and butene, and other substantially amorphous or semi-crystalline propylene-ethylene polymers.

In some embodiments, the first adhesive can include (i) an amorphous copolymer in an amount ranging from about 90 to 10 wt. % of a composition, wherein the copolymer includes 50 to 70 wt. percent of units derived from 1-butene; and (ii) a heterophase polypropylene copolymer in an amount of about 10 to about 90 wt. % of the composition, wherein the copolymer comprising units derived from propene and a comonomer selected from the group selected from ethylene, 1-hexene, 1-octene, and combinations thereof. The heterophase polypropylene copolymer can include a morphology characterized by amorphous blocks and crystalline blocks. Certain embodiments of the first adhesive include a first amorphous polyolefin copolymer and an amorphous polymer comprising units derived from 1-butene, in which the polymer has a number average molecular weight (Mn) of at least 1000 wherein the polymer is compatible with the copolymer.

In some cases, a sixth exemplary composition of the first adhesive 140 can include a hot melt adhesive composition consisting essentially of: (i) about 90 to 10 wt. % of an amorphous polyolefin copolymer composition comprising 50 to 70 wt. % 1-butene, (ii) about 10 to 90 wt. % of a heterophase polypropylene copolymer composition comprising propene and a comonomer comprising ethylene, 1-hexene or 1-octene and comprising amorphous blocks and crystalline blocks; and (iii) about 0.1 to 30 wt. % of a polyisobutylene plasticizer made with an AlCl3, wherein the adhesive provides cohesive strength from the heterophase polypropylene copolymer and adhesive strength from the amorphous polyolefin copolymer. For example, specific details of the sixth exemplary composition of the first adhesive containing the hot melt adhesive composition described herein can be found in U.S. Pat. No. 8,865,824, the entire contents of which are incorporated herein by reference.

In some cases, an exemplary composition of the first adhesive 140 can include a hot melt adhesive composition consisting essentially of: (i) an amorphous polyolefin copolymer composition comprising more than 40% 1-butene; and (ii) a second amorphous polymer comprising at least one butene monomer, the polymer having a molecular weight (MWn) of at least 1000 wherein the polymer is compatible with the polyolefin.

In some cases, an exemplary composition of the first adhesive 140 can include hot melt adhesive composition consisting essentially of: (i) about 90 to 10 wt. % of an amorphous polyolefin composition comprising more than 60% 1-butene; (ii) about 0.1 to 50 wt. % of a polyisobutylene; wherein the adhesive is substantially free of a tackifier.

For example, specific details of the seventh and eighth exemplary compositions of the first adhesive containing the hot melt adhesive composition described herein can be found in U.S. Pat. Appl. Pub. No. 2015/0174286, the entire contents of which are incorporated herein by reference. In some embodiments, the first adhesive can include a pressure sensitive adhesive, which is a type of adhesive that forms a bond when pressure is applied to bond the adhesive with an adherend. The first adhesive can include a pressure-sensitive adhesive that contains a styrenic block copolymer ("SBC"). The styrenic block copolymer can include a polystyrene block and a rubber block comprising polybutadiene, polyisoprene, or both. The rubber block(s) contain polybutadiene, polyisoprene or their hydrogenated equivalents. Exemplary SBCs include a rubber block containing a polybutadiene that can form a triblock structures such as poly(styrene-butadiene-styrene) block copolymers ("SBS") such as Kraton G-1652 manufactured by Kraton Polymers, or hydrogenated styrene-butadiene-styrene block copolymers ("SEBS"). Other exemplary SBCs include styrene-isoprene-styrene block copolymers ("SIS").

In some embodiments, the first adhesive can include a chemical compound (e.g., a tackifier) or a polymer that includes a silane. For example, certain embodiments of the first adhesive can include a silane-modified (e.g., silane-grafted) polymer, or tackifier. Examples of silane-modified polymers include silane-modified metallocene-catalyzed propylene copolymer (e.g., PP SI 1362, manufactured by Clariant), or a silane-modified amorphous propylene terpolymer (e.g, Vestoplast 206, manufactured by Evonik). In some embodiments, silane-grafting can be achieved through a modification of a polyolefinic polymer by using a vinytrimethoxysilan as a polymer modifier in silane grafting reactions. The grafting reactions can be subjected to an appropriate level of moisture and humidity to facilitate crosslinking of the silane grafts to the polymer or tackifier.

The first adhesive, in certain embodiments, can include a metallocene catalyzed ethylene alphaolefin copolymer. For example, the first adhesive can include a metallocene catalyzed ethylene alphaolefin copolymer; and an isotactic polypropylene polymer, copolymer or terpolymer.

In some cases, a ninth exemplary composition of the first adhesive 140 can include a hot melt adhesive composition comprising an ethylene-octene copolymer having a density of 0.86 g-cm-3 to 0.89 g-cm-3, a molecular weight (Mw) of about 800 to 15,000 and about 15-45 mole % octene; a crystalline isotactic polypropylene polymer having a density of 0.87 g-cm-3 to 0.9 g-cm-3; less than about 15 weight percent of a tackifing resin and about 0.1 to 10 wt. % of a nucleating agent; wherein the density of the hot melt adhesive material is less than about 0.85 g-cm-3.

In some cases, a tenth exemplary composition of the first adhesive 140 can include hot melt adhesive composition comprising about 45-65 wt. % of an ethylene-octene copolymer having a density of about 0.86 to about 0.89 g-cm-3, a molecular weight (Mw) of about 800 to 15,000 and about 15-45 mole % octane; about 35-45 wt. % of a crystalline isotactic polypropylene polymer having a density of about 0.87 g-cm-3 to about 0.9 g-cm-3; less than about 15 weight percent of a tackifing resin; and about 0.1 to 10 wt. % of a nucleating agent; wherein the density of the hot melt adhesive material is less than about 0.85 g-cm-3.

For example, specific details of the ninth and tenth exemplary compositions of the first adhesive containing the hot melt adhesive composition described herein can be found in U.S. Pat. Appl. Pub. No. 2015/0299525, the entire contents of which are incorporated herein by reference.

Still referring to FIG. 1, the composite adhesive layer 120 provided herein can include a second adhesive 150. The second adhesive 150 can include thermosetting polymers and thermoplastic polymers. In some embodiments, the second adhesive 150 is an aqueous (water-based) adhesive, when applied to the first substrate. Suitable examples of the second adhesives 150 can include, but are not limited to, vinyl acetate polymers and copolymers with ethylene, polyacrylates, polyamides, and combinations thereof. In some cases, the second adhesive can include water-based polyurethane adhesives, polyurethane dispersions, and water-soluble catalysts (e.g., methylene diphenyl diisocyanate (MDI)).

In some embodiments, the first adhesive or the second adhesive can include a mineral oil, a tackifier, an antioxidant, or a combination thereof.

In some embodiments, the first adhesive or the second adhesive can include a reactive tackifier, which is a tackifier that increases the reactivity and crosslinking associated with the first or second adhesive. In some embodiments, the first or second adhesive can include a thermoplastic hot melt adhesive containing one or more reactive tackifiers. Certain embodiments of the reactive tackifier can react with isocyanates. Some embodiments of the reactive tackifier can include moisture-curing tackifiers, such as tackifiers grafted with an alkoxysilane. Examples of a reactive tackifier can include, but are not limited to, a silanated tackifier, or a tackifier including hydroxyl functionality such as a terpenophenolic (or terpene phenol) resin.

In some embodiments, the first adhesive can include a first hot melt adhesive and the second adhesive can include a second hot melt adhesive, in which the first hot melt adhesive has a different adhesive composition than the second hot melt adhesive.

In some embodiments, the first adhesive or the second adhesive can include any of the representative compositions provided herein, wherein the first adhesive includes an adhesive composition that provides a different physical, mechanical, or chemical property than the adhesive composition of the second adhesive.

In some embodiments, the first adhesive can include any suitable high-performance-pressure sensitive adhesives (PSA) that includes a styrenic block copolymer (SBC), an acrylic-block copolymer, a silicone-based polymer, or a combination thereof. An exemplary PSA can include, but is not limited to, a poly(styrene-butadiene-styrene) (SBS), a poly(styrene-ethylene-butadiene-styrene) (SEBS), a poly (styrene-isoprene-styrene) (SIS), a poly(styrene-ethylene-propylene styrene) (SEPS), or a combination thereof.

A laminate article (e.g., laminate structure 100) can be formed by the first substrate 110, the second substrate 130, and an adhesive layer disposed between overlapping portions of the first and second substrates. The adhesive layer can include the composite adhesive layer 120 provided herein. The adhesive layer can provide the laminate structure 100 with suitable bonding properties appropriate for a specific application.

Figure 2:
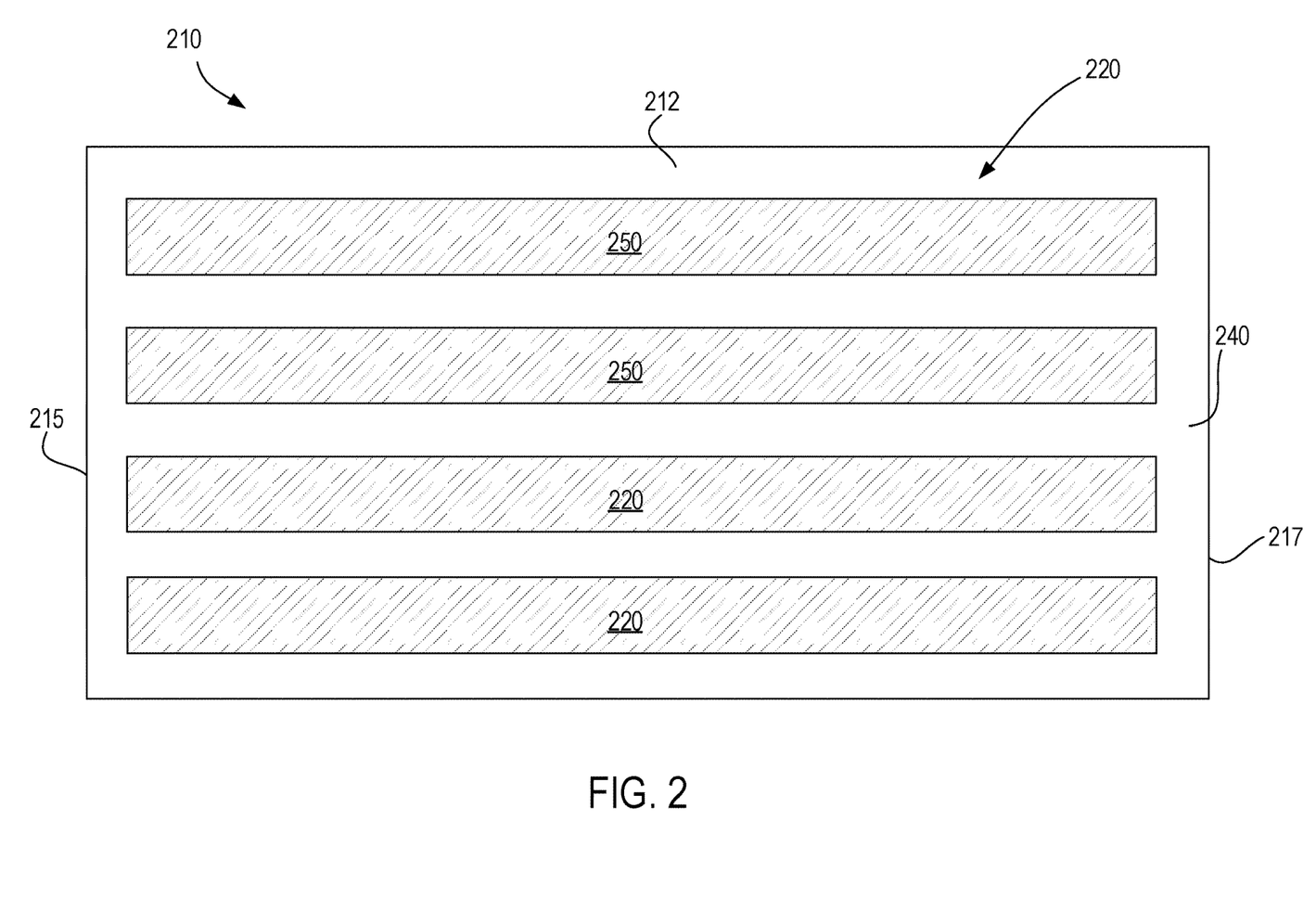
FIG. 2 is a plan view of an exemplary article provided herein that includes a substrate and a composite adhesive layer.

Referring to FIG. 2, an exemplary bondable substrate 210 can include a composite adhesive layer 220 disposed on a surface, for example, a first face 212, of the substrate 210. The embodiment of FIG. 2 is similar to the embodiment of FIG. 1, with the exception of a configuration of first and second adhesives 240, 250 that together makeup the composite adhesive layer 220. In the depicted embodiment, the first adhesive 240 is disposed in a continuous strip adjacent to the outer perimeter of the first face 212 of the substrate 210 and longitudinal strips extending from one side edge to another, opposite side edge (e.g., from a second side 215 edge to a fourth side 217) through mid-section regions of the first face 212. FIG. 2 provides a non-limiting example of a configuration for the adhesive composite adhesive layer 220 provided herein. As such, various alternative configurations of the first and second adhesives 240, 250 on the first face 212 of the substrate 210 can be applied to suitably bond the substrate 210 to another surface. Depending on the nature of the substrates, adhesive configurations can be adapted to meet desired functional performance requirements (e.g., creep testing or tensile testing) while still achieving suitable manufacturing costs.

Figure 3:
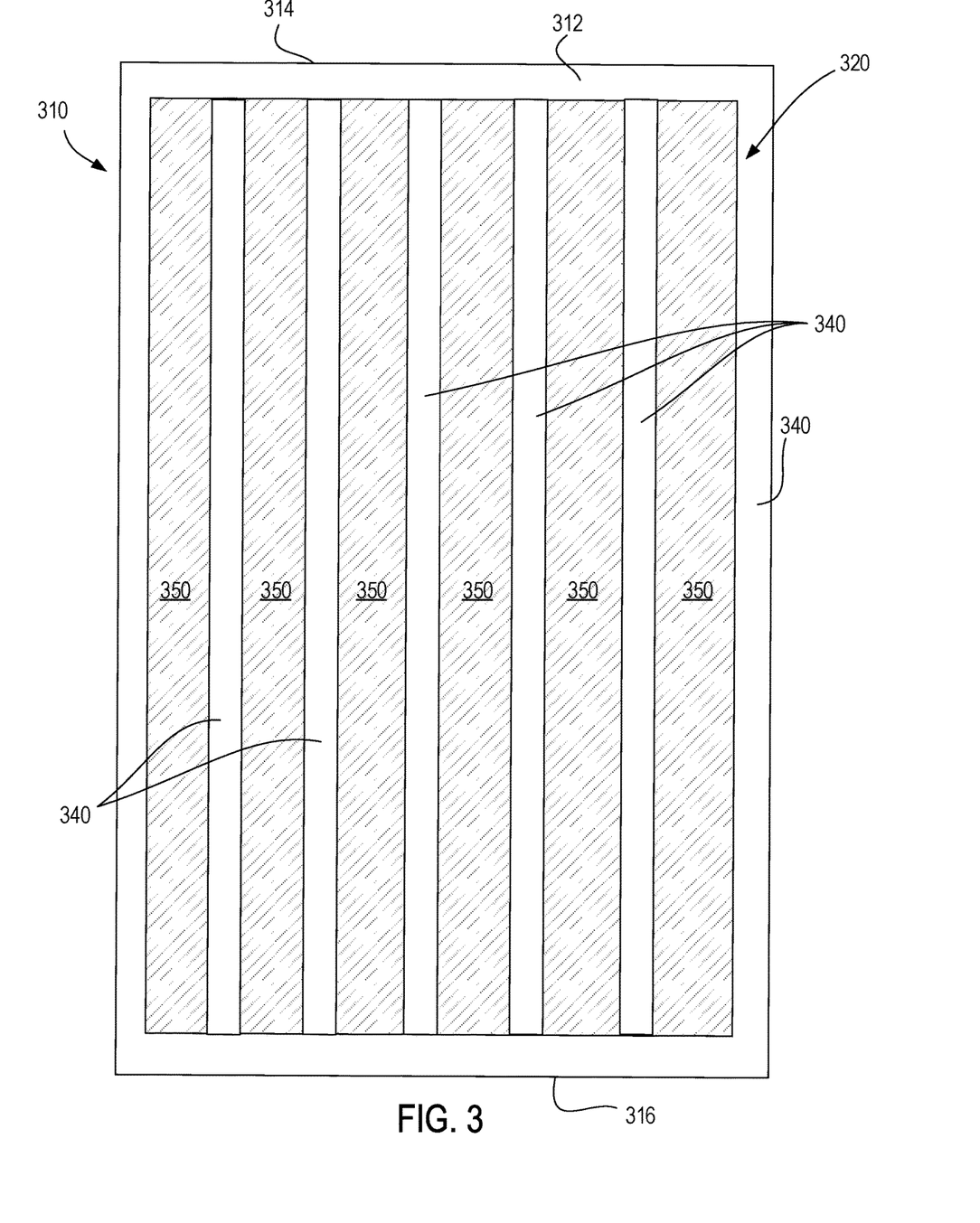
FIG. 3 is a plan view of an exemplary article provided herein that includes a substrate and a composite adhesive layer.

Referring to FIG. 3, a non-limiting exemplary bondable substrate 310 can include a composite adhesive layer 320 disposed on a surface, for example, a first face 312, of the substrate 310. The embodiment of FIG. 3 is similar to the embodiment of FIG. 1, with the exception of a configuration of first and second adhesives 340, 350 that together makeup the composite adhesive layer 320. In the depicted embodiment, the first adhesive 340 is disposed in a continuous band adjacent to the outer perimeter of the first face 312 of the substrate 310 and longitudinal strips extending from one side edge to an opposite side edge (e.g., from a first side 314 to a third side 316) through mid-section regions of the first face 312. As shown in FIG. 3, the second adhesive 350 is applied to form a complementary pattern to the discrete pattern of the first adhesive 340, and thus applied to locations on the first face 312 that do not include the first adhesive 340.

Figure 4:
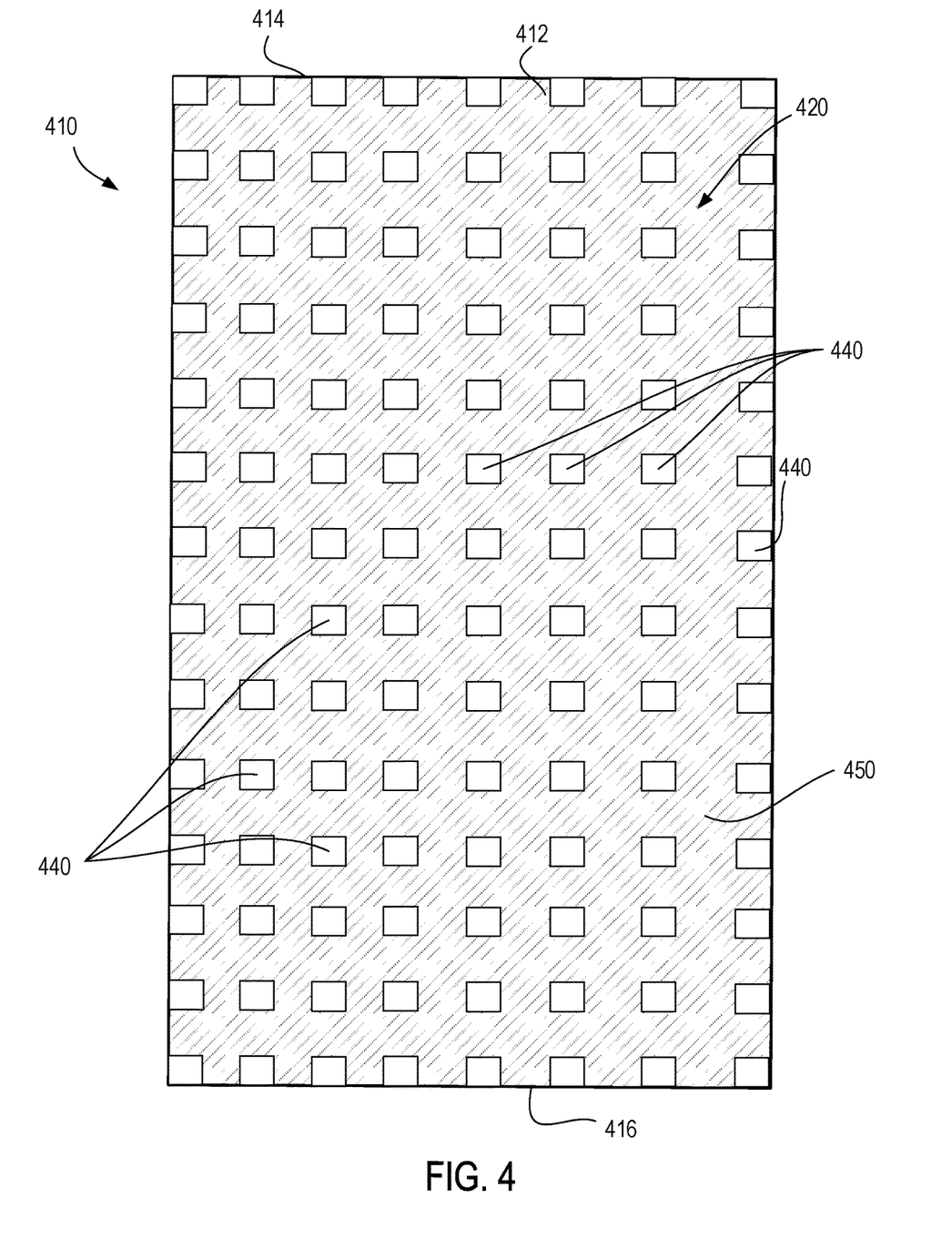
FIG. 4 is a plan view of an exemplary article provided herein that includes a substrate and a composite adhesive layer.

Referring to FIG. 4, a non-limiting exemplary bondable substrate 410 can include a composite adhesive layer 420 disposed on a surface, for example, a first face 412, of the substrate 410. The embodiment of FIG. 4 is similar to the embodiment of FIG. 1, with the exception of a configuration of first and second adhesives 440, 450 that together makeup the composite adhesive layer 420. In the depicted embodiment, the first adhesive 440 is disposed in an intermittent, discrete pattern along the entire first face 412 of the substrate 410. As shown in FIG. 4, the second adhesive 450 is applied to form a complementary pattern to the discrete pattern of the first adhesive, and thus applied to locations on the first face 412 that do not include the first adhesive 440.

Figure 5:
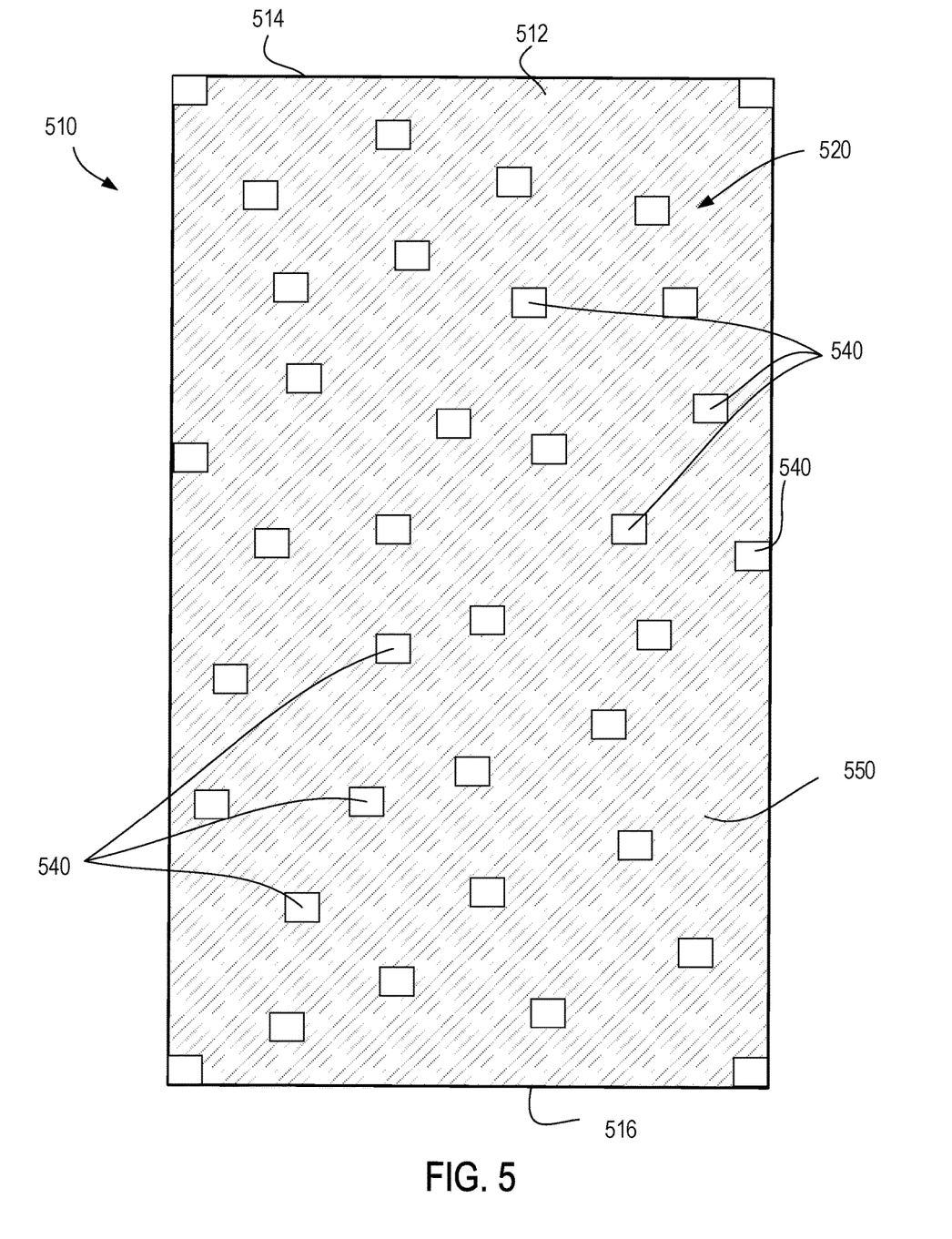
FIG. 5 is a plan view of an exemplary article provided herein that includes a substrate and a composite adhesive layer.

Referring to FIG. 5, a non-limiting exemplary bondable substrate 510 can include a composite adhesive layer 520 disposed on a surface, for example, a first face 512, of the substrate 510. The embodiment of FIG. 5 is similar to the embodiment of FIG. 1, with the exception of a configuration of first and second adhesives 540, 550 that together makeup the composite adhesive layer 520. In the depicted embodiment, the first adhesive 540 is disposed randomly in intermittent, discrete locations along the entire first face 512 of the substrate 510. As shown in FIG. 5, the second adhesive 550 is applied to form a complementary pattern to the discrete pattern of the first adhesive, and thus applied to locations on the first face 512 that do not include the first adhesive 540.

Referring back to FIG. 1, an exemplary method of forming the laminate structure 100 can include applying the composite adhesive layer 120 on the first substrate 110. The composite adhesive layer 120 can be applied to the first substrate 110 by applying the first adhesive 140 to a bonding face, such as the first face 112, of the substrate 110 in a first discrete pattern and applying the second adhesive 150 to the first face 112 in a second discrete pattern that is complementary to the first discrete pattern. Processes for applying the first and second adhesives 140, 150 on to a substrate can include, but are not limited to, slot die coating (e.g., using a comb shim slot die application), spraying, extruding (e.g., bead extrusion or micro-bead extrusion), casting, brushing, rolling, or knife coating. In some cases, the first adhesive, the second adhesive, or both, can be applied using a spraying process that applied the adhesive(s) in a random distribution. For instances, a spraying process can be achieved using a random distributing sprayer, such as the Continuous Signature spray nozzles manufactured by Nordson Corporation, or fiberized spray applicators manufactured by ITW Dynatec. In some embodiments, the first adhesive 140 includes applying a liquid form of a hot melt adhesive. In some embodiments, the first adhesive 140 can be applied in the form of a sheet. The sheet of the first adhesive 140 can have a thickness of about 0.002 inches. The second adhesive 150 can be applied as an aqueous adhesive.

The first and second adhesives 140, 150 can be applied to the substrate in various patterns. In some embodiments, the first adhesive 140 can be applied along an outer perimeter of the first face 112 (which can also be referred to as the bonding face) of the substrate 110, and the second adhesive can be applied in the interior areas of the first face 112 of the substrate 110. In some embodiments, the first adhesive 140 can be applied on to the first face 112 of the first substrate 110 to form a grid pattern.

Still referring to FIG. 1, an exemplary method of forming the laminate structure 100 can include disposing the first adhesive 140 on the bonding face (e.g., the first face 112) of the first substrate 110 in a first discrete pattern. The first adhesive 140 can include a urethane hot melt adhesive. The method can include disposing the second adhesive 150 on the first face 112 in a second discrete pattern that is complementary to the first discrete pattern. The method can include placing the second substrate 130 over the first face 112 of the first substrate 110 to form the laminate structure 100. The method optionally includes applying pressure to the laminate structure 100 to bond the first substrate 110 to the second substrate 130 for a predetermined time. In some embodiments, the pre-determined time ranges from about 5 seconds to about four hours (e.g., from about 30 seconds to about 1 minute (min), from about 1 min to about 5 mins, from about 5 mins to about 15 mins, from about 15 mins to about 30 mins, from about 30 mins to about 1 hour, and from about 1 hour to about 2 hours, from about 2 hours to about 4 hours). The time for the laminate structure to reach a fully set or cured state can range from about 1 hour to about 7 days (e.g., from about 1 hour to about 5 hours, from about 5 hours to about 12 hours, from about 12 hours to about 24 hours, from about 24 hours to about 48 hours, from about 2 days to about 4 days, from about 4 days to about 7 days). In some embodiments, the applied pressure ranges from about 50 psi to about 300 psi (e.g., from about 50 psi to about 100 psi, from about 100 psi to about 150 psi, from about 150 psi to about 200 psi, or from about 200 psi to about 300 psi).

EXAMPLE

Door Laminate

An exemplary door laminate can be formed using a composite adhesive layer provided herein to adhere a substrate to a surface. The composite adhesive layer can be formed by applying the first adhesive provided herein on a bonding surface area of a substrate made of a medium density fiberboard (MDF), or a hard wood. The first adhesive can be applied in a first discrete pattern by applying the first adhesive along a path that is adjacent to the outer perimeter of the bonding surface area and optionally across mid-section regions of the bonding surface area. The path can be defined by a pre-determined width. For example, in some embodiments, the pre-determined width of the path can be about 0.5 inches or less.

The composite adhesive layer of the door laminate can include the second adhesive provided herein (e.g., polyvinyl acetate) by applying the second adhesive to the bonding surface area as a second discrete pattern that is complementary to the first discrete pattern.

The composite adhesive layer of the substrate, prior to being coupled to a surface, can include the first discrete pattern that occupies about 10% to about 25% of the bonding surface area of the substrate. The second discrete pattern can be applied to occupy a balance of the bonding surface area that remains after applying the first adhesive.

The door laminate can be assembled into a final article by bonding the first substrate to a second substrate. In various embodiments, the second substrate can include a wooden door skin. The wooden door skin can contain, but is not limited to, materials made of oak, cherry, maple, gum, cedar, birch, and combinations thereof. The first and second substrates can be bonded together by an adhesive layer disposed between overlapping portions of the first substrate and the second substrate A number of embodiments of the invention have been described. Nevertheless, it will be understood that various modifications can be made without departing from the spirit and scope of the invention. Accordingly, other embodiments are within the scope of the following claims.

The invention claimed is:

1. An article comprising:
 a substrate including a bonding surface area, the substrate comprising a foam;
 a first adhesive disposed on the bonding surface area in a first discrete pattern, the first adhesive comprising a hot melt adhesive; and
 a second adhesive disposed on the bonding surface area in a second discrete pattern that is complementary to the first discrete pattern;
 wherein the first discrete pattern comprises about 1% to about 25% of the bonding surface area and the second discrete pattern comprises a balance of the bonding surface area.

2. The article of claim 1, wherein the first adhesive comprises a urethane or a blend of a polyurethane and a thermoplastic polymer.

3. The article of claim 1, wherein the thermoplastic polymer is selected from the group consisting of polyesters, vinyl polymers, acrylic block copolymers, and combinations thereof.

4. The article of claim 1, wherein the first adhesive comprises an amorphous polyolefin (APO).

5. The article of claim 1, wherein the first adhesive comprises:
   (i) an amorphous copolymer in an amount ranging from about 90 to 10 wt. % of a composition, wherein the copolymer includes 50 to 70 wt. percent of units derived from 1-butene; and
   (ii) a heterophase polypropylene copolymer in an amount of about 10 to about 90 wt. % of the composition, wherein the copolymer comprising units derived from propene and a comonomer selected from the group selected from ethylene, 1-hexene, 1-octene, and combinations thereof;
   the copolymer having a morphology characterized by amorphous blocks and crystalline blocks.

6. The article of claim 1, wherein the first adhesive comprises a first amorphous polyolefin copolymer and an amorphous polymer comprising units derived from 1-butene, the polymer having a number average molecular weight (Mn) of at least 1000 wherein the polymer is compatible with the copolymer.

7. The article of claim 1, wherein the first adhesive comprises a styrenic block co-polymer (SBC).

8. The article of claim 1, wherein the first adhesive comprises a silane-modified polymer or tackifier.

9. The article of claim 1, wherein the first adhesive comprises a metallocene catalyzed ethylene alpha-olefin copolymer.

10. The article of claim 1, wherein the first adhesive comprises a composition comprising a metallocene catalyzed ethylene alpha-olefin copolymer; and an isotactic polypropylene polymer, copolymer, or a terpolymer.

11. The article of claim 1, wherein the second adhesive comprises an aqueous adhesive.

12. The article of claim 1, wherein the second adhesive is a thermoplastic polymer selected from a group consisting of vinyl acetate polymers and copolymers with ethylene, polyacrylates, polyamides, and combinations thereof.

13. The article of claim 1, wherein the first and second adhesives together form a continuous adhesive layer that substantially covers an entire bonding surface area of the substrate.

14. The article of claim 1, wherein the first adhesive forms a grid pattern on the substrate.

15. A method comprising:
   applying a first adhesive to a bonding surface area of a substrate in a first discrete pattern, the first adhesive comprising a hot melt adhesive, the substrate comprising a foam; and
   applying a second adhesive to the bonding surface area in a second discrete pattern that is complementary to the first discrete pattern, wherein the first adhesive comprises a first amorphous polyolefin copolymer and an amorphous polymer comprising units derived from 1-butene, the polymer having a number average molecular weight (Mn) of at least 1000 wherein the polymer is compatible with the copolymer.

16. A laminate comprising:
   a first substrate comprising a foam;
   a second substrate; and
   an adhesive layer disposed between overlapping portions of the first and second substrates, the adhesive layer comprising:
   a hot melt adhesive; and
   a second adhesive, wherein the second adhesive comprises an aqueous adhesive.

17. The laminate of claim 16, wherein the first substrate comprises expanded polystyrene (EPS).

18. The article of claim 1, wherein the substrate comprises expanded polystyrene (EPS).

19. The article of claim 1, wherein the second discrete pattern comprises about 10% to about 50% of the bonding surface area.

* * * * *